(12) United States Patent
Kappi et al.

(10) Patent No.: US 6,834,528 B2
(45) Date of Patent: Dec. 28, 2004

(54) METHOD, DEVICE AND SYSTEM FOR CALIBRATING ANGULAR RATE MEASUREMENT SENSORS

(75) Inventors: Jani Kappi, Tampere (FI); Jussi Collin, Tampere (FI)

(73) Assignee: Nokia Corporation, Espoo (FI)

( * ) Notice: Subject to any disclaimer, the term of this patent is extended or adjusted under 35 U.S.C. 154(b) by 97 days.

(21) Appl. No.: 10/292,409

(22) Filed: Nov. 12, 2002

(65) Prior Publication Data

US 2003/0115930 A1 Jun. 26, 2003

(30) Foreign Application Priority Data

Nov. 13, 2001 (EP) ............................................ 01126973

(51) Int. Cl.[7] ............................................... G12B 13/00
(52) U.S. Cl. ........................ 73/1.75; 73/1.78; 73/1.79; 73/1.37
(58) Field of Search ............................... 73/1.37, 1.75, 73/1.77, 1.78, 1.79

(56) References Cited

FOREIGN PATENT DOCUMENTS

| DE | 19925434 | 12/2000 |
|---|---|---|
| EP | 0557591 | 9/1993 |
| EP | 1087209 | 3/2001 |
| JP | 2001004379 | 1/2001 |
| WO | WO0037891 | 6/2000 |

OTHER PUBLICATIONS

World Geodetic System 1984 (WGS 84), website pages found at www.wgs84.com/wgs84.htm, 7 pages.

*Primary Examiner*—Richard A. Moller
(74) *Attorney, Agent, or Firm*—Ware, Fressola, Van Der Sluys & Adolphson LLP

(57) ABSTRACT

The present invention describes a method to calibrate an angular measurement device using acceleration measurement device. The angular rate measurement device includes at least one angular measurement sensor, wherein the acceleration measurement device is able to distinguish the direction and strength of gravity. By performing the calibration method the scale factor(s) of the angular measurement device and the strength and direction of gravity can be obtained and/or corrected. An embodiment according to the method of the present invention describes optional use of a communication network to perform necessary evaluation and calculation steps at a remote device.

37 Claims, 3 Drawing Sheets

(state of the art)

Fig. 1 (state of the art)

METHOD, DEVICE AND SYSTEM FOR CALIBRATING ANGULAR RATE MEASUREMENT SENSORS

CROSS REFERENCE TO RELATED APPLICATIONS

This application claims priority under 35 USC §119(e) to European Patent Application No. 01126973.5-2213 filed on Nov. 13, 2001.

TECHNICAL FIELD

The present invention is related to a method, device and system for calibrating angular measurement sensors. Particularly the present invention is relates to a method, device and system for calibrating angular measurement sensors using an acceleration measurement device to provide a set of calibration steps to calibrate the angular measurement sensors in a cheap, fast and easy manner.

BACKGROUND OF THE INVENTION

Inertial navigation systems are used to track the position of objects, such as vehicles, planes and also for handheld personal systems for personal use. Since navigation is possible using GPS systems the combination of GPS receivers and inertial navigation systems is applied. GPS receivers are able to track a movement path but due to the timely distance of the signal only a coarse grid of the movement can be obtained. Besides, navigational information like current orientation of an object cannot be obtain using GPS systems. Therefore an inertial navigation systems is added to the GPS systems. Data obtained by the GPS systems are used as reference position for the inertial navigation systems. Fine grid of the movement can be determined thereby.

Inertial navigation systems are accomplished by integrating the output of a set of sensors to compute position, velocity and orientation to trace movements beginning at an initialisation point. In order to gain this information, linear acceleration measurements with respect to initial space and angular rate measurements, again with respect to initial space, have to be performed. These measurements allow solving of the inertial differential equations leading to position, velocity and orientation. The assembly of linear acceleration measurement sensors (accelerometers) to measure the linear acceleration and angular rate measurement sensors to measure the angular rate is known as inertial sensor assembly (ISA).

It has to be considered that the most important disadvantage of inertial navigation systems is involved by the procedure of solving a differential equation. The basic measurement data are acceleration and angular rate values obtained by the inertial sensor assembly. These values have to be integrated in time once in case of angular rate and twice in case of acceleration values. Errors due to erroneous calibration, bias, drift or changing environmental influence cause relative high deviation, particularly if the integration time is long.

Current acceleration measurement devices have reached a relatively high accuracy, but angular rate measurement sensors like gyroscopes suffer in accuracy. To calibrate angular rate measurement sensors expensive 3-dimensional turn-rate tables have to be applied. The scale factor of the angular rate measurement sensor is determined by using these turn-rate tables. This calibration measurement is only available in specially equipped laboratories. But the scale factor of angular rate measurement sensors is strongly dependent on the condition of usage, like aging, temperature, humidity etc. Effects influencing the measurement results of angular rate measurement sensors are often compensated in prior devices by using expensive additional electronic equipment which is not able to be accurate at any time. The electronic equipment uses pre-measured calibration data obtained in environment simulation systems to estimate the correct scale factor. Re-calibration of such sensors is necessary to ensure permanent accuracy which is a time and cost-intensive procedure.

A method of easily and quickly calibrating angular measurement sensors is not known hitherto, but it would be desired to provide reliable systems at an acceptable price. An inertial sensor assembly used in inertial navigation systems comprises angular rate measurement sensors and linear acceleration measurement sensors like those described above. A linear acceleration sensor can not distinguish between acceleration related to change of the velocity of the assembly and acceleration due to gravity of the earth. Therefore, it is often assumed that the gravity is constant or a model is applied using the latitude since the shape of the earth can be modelled as a rotational ellipsoid. One of the models is given by the standard model known as WGS-84 system defined by the Defense Mapping Agency. Conveniently, it would be a great advantage to measure the local gravity acceleration value to ensure application of an exact acceleration value of the gravity to increase the accuracy of inertial navigation.

SUMMARY OF THE INVENTION

An object of the present invention is to provide a method and a device to calibrate the scale factor of an angular measurement sensor. Therefore an accelerometer measurement device attached in a fixed way to the angular rate measurement sensor is used to determine values necessary for calibrating.

Another object of the present invention is to provide a method and a device to measure the current acceleration value of the locally sensed gravity simultaneously with the calibration process of an angular measurement sensor.

A further object of the present invention is to provide a device comprising an acceleration measurement device and units to perform the calibration method according to the present invention.

A further object of the present invention is to provide a device additionally using a transmission network for exchanging data due to the above described calibration method.

A further object of the present invention is to provide a system comprising at least one angular measurement sensor and a device for calibrating the angular measurement sensor including the possibility of remotely operating the calibration steps.

To solve the objects of the present invention, a method for easily calibrating an angular rate measurement sensor is provided accordingly.

To reach this and other advantages and in accordance with the purpose of the present invention the method comprises several steps to obtain data necessary for calibration. The angular measurement sensor is attached to the acceleration measurement device in any fixed way in order to ensure that both the angular measurement sensor and the acceleration measurement device are displaced simultaneously in the same way when the arrangement of both is displaced. In a first step the assembly of angular measurement sensor which shall be calibrated and the acceleration measurement device is placed in a stationary position, for example placed on an table. In this position the level plane is determined by the acceleration measurement device. Said level plane shall be understood as the locally plane perpendicular to the direction of the gravity vector. The initial value of the angular measurement sensor to be calibrated is set to a pre-defined initial value, but may be preferably set to zero. Correspondingly, it may be possible that a set of initial values of the angular measurement sensor may have to be set to a set of pre-defined initial values. The definition of the initial value may be necessary due to a following evaluation and calculation process of the measured values. In a next step the assembly of the angular measurement sensor and acceleration measurement device is displaced. The displacement may be performed in an adequate way with respect to the capabilities of the angular measurement sensor. Measured values are determined by the angular measurement sensor during displacement of the assembly. After displacement the assembly is placed back to the stationary position similar to that in the first calibration step. Again the level plane is determined using the acceleration measurement device. Now independent measurements of the displacement procedure are available and consequently, the change of the orientation is determined. The determination of the level planes allows to calculate an angle of displacement. The obtained measured values according to the angular measurement sensor allow calculation of a further angle of displacement. Nevertheless the calculated angles may be compared. The comparison of these angles may allow estimation of the accuracy of the angular measurement sensor and may enable improvement of the accuracy of measurement thereof by suitable procedures. Preferably, a calibration setting of the angular measurement sensor may be modified or re-defined in order to enable accurate measurements of the angular measurement sensor.

Preferably, the above described method according to an embodiment of the invention is not limited to the usage of a single angular measurement sensor. It is self explaining that the embodiment may be extended to calibrate more than one angular rate measurement sensor using the acceleration measurement device. During displacement several angular measurement sensors may produce measured values according to the displacement procedure. Therefore, each angular measurement sensor provides the possibility to obtain an angle according to the above described embodiment. The respective angles may be compared with the angle obtained from the measured level planes obtained by the acceleration measurement device.

Conveniently, differences in the angles can be reduced to an erroneous scale factor of the angular measurement sensor since the acceleration measurement devices used are very precise. A corrected scale factor may be obtained by applying the difference of the angles. Additional information concerning the displacement procedure may have to be included in the determination of a correct scale factor. More preferably, this new scale factor is used for re-calibrating the angular measurement sensor and applied to further measurements thereafter.

Additionally, the angular measurement sensor may be an angular rate measurement sensor. That means, that the angular rate measurement sensor is able to determine speed values. These determined speed values may be measured with respect to an axis. The definition of an initial speed value may be necessary due to a following evaluation and calculation process of the speed values. The evaluation and calculation of the speed values includes an integration of the speed values to obtain an angle of displacement according to the displacement procedure carried out to calibrate the angular measurement sensor. This integration process may be performed during the rotation procedure but it may be also possible only to obtain the speed values and store these speed values in order to perform the integration after the displacement procedure.

Preferably, the speed values obtained during the displacement procedure are rotation speed values. Moreover, the rotation speed may be a rotation speed with respect to an axis. Since the displacement with respect to axis is not limited to a rotation procedure the determined speed may be also a pivoting speed or any other displacement related rotation speed describing the displacement procedure.

Conveniently, the speed values obtained during the displacement procedure may be angular speed values or angular rate values. Moreover, the angular speed may be an angular speed with respect to an axis. The displacement of the assembly may be an arbitrary displacement procedure. The angular measurement sensor may only be effected by displacement with respect to a certain axis. But the angular measurement sensor may be able to determine arbitrary changes of the movement related to the certain axis and therefore, the movement may by completely reconstructed by the measured angular speed values of the angular measurement sensor.

Additionally, the angular measurement sensor may be an angular rate integrating measurement sensor. The evaluation of the angle obtained by the angular rate integrating measurement sensor may be reduced to a subtraction of two angles, the initial angle and the angle obtained after the displacement procedure. The subtracting will be performed simultaneously by the angular rate integrating sensor during the measurement process of the angular rate integrating measurement sensor or the displacement procedure according to the calibration method, respectively.

Preferably, the displacement may be performed with respect to and by a certain angle. The axis may be defined according to the measurement properties of the angular measurement sensor. Moreover, the angular measurement sensor may be only able to measure displacements according to a certain axis. Therefore, it is advantageous to displace the assembly of angular measurement sensor and acceleration measurement device with respect to this axis to avoid side effects affecting the measurement process of the angular measurement sensor and the acceleration measurement device.

Conveniently, the angle may be a rotation angle. The rotation angle may be defined with respect to an axis. The axis may be defined according to the measurement properties of the angular measurement sensor. Of course, the angle may not be limited to a rotation since arbitrary angular displacements with respect to the axis may be possible and these angular displacements may be determined using the angular measurement sensor. Also arbitrary pivoting displacements may be possible.

Additionally, a rotation angle of about 360° is advantageous since parasitic measurement effects can be neglected known by people skilled in the art.

Preferably, in order to obtain acceleration measurement values as trustworthy as possible the rotation axis shall be substantially parallel to the level plane, i.e. substantially perpendicular to the direction of the gravity of the acceleration vector. In this case the determination of the level plane before and after the rotation procedure and the calculated rotation angle therefrom is more precise, respectively.

Conveniently, the calibration method is repeated as long as the deviation of the angles is beyond a threshold value. This iterative process will lead to a reliable calibration of the angular measurement sensor. A small deviation of the angles obtained by the angular measurement sensor and the acceleration measurement device will enable the calculation of a more confident scale factor. A large deviation may increase the variation of the scale factor due to the estimation process of the scale factor from the difference of the obtained angle.

Additionally, due to the simplicity of the calibration process it is possible to repeat the above described calibration process in order to check the new corrected scale factor of the angular measurement device. These repetitions may be performed until the deviation of the orientation calculated by using the acceleration measurement device or the angular measurement sensor, respectively, is beyond a predetermined threshold and is sufficiently accurate.

Preferably, if the acceleration measurement values determined during the displacement procedure may be recorded, the values of the acceleration measurement related to the measurement direction non parallel to a displacement axis change their values due to the changing part of the gravity acceleration. Obtaining minimal and maximal values allows one to gain an exact value of the gravity acceleration according to their local value. This is useful since local gravity acceleration can change particularly if the assembly is used in regions with abnormal gravity. The calibration process of the angular measurement sensor and the measurement of the gravity acceleration may be performed simultaneously. A rotation procedure with respect to a displacement axis by an angle of 360° may be preferable and may ensure that the obtained acceleration values are valid for obtaining the strength of the local gravity. According to the demanded, effects restricting the accuracy of the measurement of the gravity acceleration like centrifugal acceleration and the like may be taken into consideration.

Conveniently, to ensure that the measured gravity acceleration is exact, the rotation procedure has to be repeated at least applying it to the other axis to be rotated along with it. More conveniently, at least the axis to be rotated along shall be perpendicular to that one used before to ensure that all acceleration measurement directions measured by the acceleration measurement device for calibrating the angular measurement device are involved in obtaining the acceleration of Earth's gravity.

According to another aspect of the present invention, a computer program for carrying out the method for calibrating an angular measurement sensor using an acceleration measurement device is provided, which comprises program code means for performing all of the steps of the method for calibrating when said program is run on a computer, network, a mobile device, or an application specific integrated circuit. The method of calibrating comprises determining a level plane in a first stationary position using the acceleration measurement device, determining measured values during the displacement procedure by the angular measurement sensor, determining again the level plane in a second stationary position comparable with the first stationary position, receiving an angle using the determined level planes and receiving an angle according to the measured values determined by the angular measurement sensor.

Preferably, the angles are compared in order to check the calibration of the angular measurement sensor since brief displacements can be obtained more precisely using acceleration measurement devices. More preferably, a new scale factor may be determined using the obtained angles if the difference of the obtained angles is beyond a pre-defined threshold values. A new scale factor for the angular measurement sensor may be necessary to obtain trustworthy measurements by the angular measurement sensor. Further preferably, the angular measurement sensor is re-calibrated using the new scale factor.

Conveniently, the angular measurement sensor may be a angular rate measurement sensor and the measured values obtained by the angular rate measurement sensor may be measured speed values. The angle of the displacement procedure according to the angular rate measurement sensor may be obtained by integrating the speed values. A setting of the angular rate measurement sensor to an initial speed value may be necessary in order to perform the integration of the obtained speed values. Moreover, the speed values may be measured with respect to an axis defined by the angular rate measurement sensor. Further, the speed values may be rotation speed values. Additionally, the speed values may be angular speed values. The speed values may not be limited to a rotation speed or a angular speed since the displacement may be carried out in an arbitrary way. Conveniently, the angular measurement sensor may be a angular rate integrating measurement sensor and the measured values obtained by the angular rate integrating measurement sensor may be measured angle values. The angle of the displacement according to the angular rate integrating measurement sensor may be obtained by subtracting the angle values. A setting of the angular rate integrating measurement sensor to an initial angle value may be necessary in order to perform the subtraction of the obtained angle values. Moreover, the angle values may be measured with respect to an axis defined by the angular rate integrating measurement sensor.

Conveniently, the displacement of the assembly comprising the angular measurement sensor and the acceleration measurement device may be a displacement by a certain angle with respect to an axis. The axis may be defined by the angular measurement sensor. Preferably, the angle may be a rotation angle or a rotation angle with respect to the axis defined by the angular measurement sensor, respectively. Further, the angular measurement device may be rotated by about 360° around the corresponding axis. Further, the axis around which the acceleration measurement device and the angular measurement sensor may be rotated is substantially perpendicular to the direction of the gravity vector.

Additionally, the calibration method may be repeated as long as said deviation of the angles is beyond a threshold value.

Conveniently, acceleration signals generated by the acceleration measurement device may be determined during displacement to obtain maximal and minimal acceleration values of the acceleration sensors used for measuring acceleration perpendicular to the rotating axis to gain the local acceleration value of the gravity. A rotation procedure with respect to an axis by an angle of 360° may ensure that the obtained acceleration values may be valid for obtaining the strength of the local gravity.

According to yet another aspect of the invention, a computer program product is provided comprising program code means stored on a computer readable medium for carrying out the method for calibrating an angular measurement sensor using an acceleration measurement device when said program product is run on a computer, a network device, a mobile terminal, or an application specific integrated circuit. The method of calibrating comprises determining a level plane in a first stationary position using the acceleration measurement device, determining measured values during the displacement procedure by the angular measurement sensor, determining again the level plane in a second stationary position comparable with the first stationary position, receiving of an angle using the determined level planes and receiving an angle according to measured values determined by the angular measurement sensor.

Preferably, the angles are compared in order to check the calibration of the angular measurement sensor since brief displacements may be obtained more precisely using acceleration measurement devices. More preferably, a new scale factor my be determined using the obtained angles if the difference of the obtained angles is beyond a pre-defined threshold values. A new scale factor for the angular measurement sensor may be necessary to obtain trustworthy measurements by the angular measurement sensor. Further preferably, the angular measurement sensor is re-calibrated using the new scale factor.

Conveniently, the angular measurement sensor may be a angular rate measurement sensor and the measured values obtained by the angular rate measurement sensor may be measured speed values. The angle of the displacement procedure according to the angular rate measurement sensor may be obtained by integrating the speed values. A setting of the angular rate measurement sensor to an initial speed value may be necessary in order to perform the integration of the obtained speed values. Moreover, the speed values may be measured with respect to an axis defined by the angular rate measurement sensor. Further, the speed values may be rotation speed values. Additionally, the speed values may be angular speed values. The speed values may not be limited to a rotation speed or a angular speed since the displacement may be carried out in an arbitrary way. Conveniently, the angular measurement sensor may be a angular rate integrating measurement sensor and the measured values obtained by the angular rate integrating measurement sensor may be measured angle values. The angle of the displacement according to the angular rate integrating measurement sensor may be obtained by subtracting the angle values. A setting of the angular rate integrating measurement sensor to an initial angle value may be necessary in order to perform the subtraction of the obtained angle values. Moreover, the angle values may be measured with respect to an axis defined by the angular rate integrating measurement sensor.

Conveniently, the displacement of the assembly comprising the angular measurement sensor and the acceleration measurement device may be a displacement by a certain angle with respect to an axis. The axis may be defined by the angular measurement sensor. Preferably, the angle may be a rotation angle or a rotation angle with respect to the axis defined by the angular measurement sensor, respectively. Further, the angular measurement device may be rotated by about 360° around the corresponding axis. Further, the axis around which the acceleration measurement device and the angular measurement sensor may be rotated is substantially perpendicular to the direction of the gravity vector.

Additionally, the calibration method may be repeated as long as said deviation of the angles is beyond a threshold value.

Conveniently, acceleration signals generated by the acceleration measurement device may be determined during displacement to obtain maximal and minimal acceleration values of the acceleration sensors used for measuring acceleration perpendicular to the rotating axis to gain the local acceleration value of the gravity. A rotation procedure with respect to an axis by an angle of 360° may ensure that the obtained acceleration values may be valid for determining the strength of the local gravity.

According to a further aspect of the invention, a device to be calibrated using above described method of the present invention comprises an acceleration measurement device, a unit for determining a level plane using the acceleration measurement device therefor, a unit for determining values measured by the angular measurement sensor, a unit for receiving an angle obtained by two level plane determinations, a unit for receiving an angle according to the values measured by the angular measurement sensor. The acceleration measurement device includes an arrangement of sensors able to distinguish the direction of gravity related to the three space directions. The units enable the steps to be performed according to the above described method for calibrating a angular measurement sensor using an acceleration measurement device.

The device for calibrating an angular measurement sensor may comprise more than one angular measurement sensor, like inertial navigation devices. It is obvious, that the calibration process of a device including more than one angular measurement sensor may be extended in an analogue way. The angles obtained by the level plane determinations using the acceleration measurement device may be compared with angles obtained by each angular measurement sensor of the plurality of angular measurement sensors. It is obvious, that the method for calibrating an angular measurement sensor may be extended accordingly to a method for calibrating a plurality of angular measurement sensors.

Preferably, the embodiment of the device for calibrating further comprises a unit for determining a scale factor of the angular measurement sensor using the angles obtained by the level plane determinations and the angles obtained by the angular measurement sensor and a unit for re-setting the determined scale factor to the angular measurement sensor.

Additionally, means to re-calibrate the angular measurement sensor according to the obtained new scale factor are advantageous. The means for re-calibrating like an electronic connection between calibration device and angular measurement sensor allow the transmission of the obtained calibration data directly to the angular measurement device so that no connection calibration data have to be transmitted in an manually way. Due to the type of the angular measurement sensor and the possibly connected signal processing unit, different ways of setting a new scale factor are possible.

Preferably, the embodiment of the device for calibrating comprises additionally a unit for determining the maximal and/or minimal acceleration value during the displacement procedure. More preferably, the acceleration signals generated by the acceleration measurement device may be determined during rotation to obtain maximal and minimal acceleration values of the acceleration sensors used for measuring acceleration perpendicular to the rotating axis to gain the local acceleration value of the gravity. A rotation procedure with respect to an axis by an angle of 360° may ensure that the obtained acceleration values may be valid for determining the strength of the local gravity.

As the described method can be performed easily and quickly, it is possible to implement a unit for detecting possible mis-calibration of the scale factor of the angular measurement sensor or the gravity acceleration. This unit can signal the user to recalibrate. Typical characteristics of mis-calibration can be changing of temperature, humidity, aging like that described above, thereby affecting the accuracy of the assembly. But it is also possible to propose the user of such a device to recalibrate it after a certain time of use to ensure correct device function.

Additionally, the units necessary to perform the steps of the calibration method can be actuated remotely. Therefore the device comprises additionally a unit for transmitting and receiving data via a transmission network. Determination and evaluation steps of the method require complex calculations so that it can be advantageous to carry out several steps at a remote side. Due to the certain embodiment of the device, different units may be replaced by using remote units or devices which are able to perform the operation of the units which they replace.

For example, an embodiment may comprise no built-in evaluation and/or calculation units, since measured values of the sensor measurement units and acceleration measurement devices may be transmitted by a transmission and receiving unit. The measured values are transmitted directly to a remote instance where the necessary calculations and evaluations may be performed. Only calibration data may be sent back to the device.

Another embodiment of the device may comprise a unit for obtaining the measured values related to the angular measurement sensor, e.g. an integration unit to gain the attitude angle related to the rotation axis. In this case the determination of the level planes and the comparison of the attitudes due to the two measurement devices as also the evaluation and calculation of the angular measurement sensor calibration may be performed at the remote side.

This kind of implementation of the units for calibrating can be used advantageously by implementing only units which are used often and not only for determining and evaluation due to the calibration method. All units which are only used for calibration can be replaced by the employment of remote evaluation and calculation service.

Conveniently, the transmission and receiving unit can be realised using existing communication networks able to transmit data. A wide area network is of special interest to provide this implementation to a great variety of devices. The wide area network can be a wide area radio communication network, a wide area mobile communication network, like global system for mobile communication (GSM), universal mobile telecommunication system (UTMS), wideband code division multiple access (WCDMA) or likely or related mobile communication standards. But also local area transmission network can be of interest to perform evaluation and calculation steps on a personal or mobile computer or any device able to perform the evaluation and calculation steps according to the calibration method. A local area communication network can be a low power radio frequency network, an infrared transmission network, a network based on wireless local area network (WLAN) or even a wire-based connection like universal serial bus (USB), Firewire bus or serial connection or any other kind of wire-based connection.

Conveniently, the angular measurement sensor may be an angular rate measurement sensor and the measured values obtained by the angular rate measurement sensor may be measured speed values. The angle of the displacement procedure according to the angular rate measurement sensor may be obtained by integrating the speed values. A setting of the angular rate measurement sensor to an initial speed value may be necessary in order to perform the integration of the obtained speed values. Moreover, the speed values may be measured with respect to an axis defined by the angular rate measurement sensor. Further, the speed values may be rotation speed values. Additionally, the speed values may be angular speed values. The speed values may not be limited to a rotation speed or an angular speed since the displacement may be carried out in an arbitrary way. Conveniently, the angular measurement sensor may be an angular rate integrating measurement sensor and the measured values obtained by the angular rate integrating measurement sensor may be measured angle values. The angle of the displacement according to the angular rate integrating measurement sensor may be obtained by subtracting the angle values. A setting of the angular rate integrating measurement sensor to an initial angle value may be necessary in order to perform the subtraction of the obtained angle values. Moreover, the angle values may be measured with respect to an axis defined by the angular rate integrating measurement sensor.

Conveniently, the displacement of the assembly comprising the angular measurement sensor and the acceleration measurement device may be a displacement by a certain angle with respect to an axis. The axis may be defined by the angular measurement sensor. Preferably, the angle may be a rotation angle or a rotation angle with respect to the axis defined by the angular measurement sensor, respectively. Further, the angular measurement device may be rotated by about 360° around the corresponding axis. Further, the axis around which the acceleration measurement device and the angular measurement sensor may be rotated is substantially perpendicular to the direction of the gravity vector.

Additionally, the calibration may be repeated as long as said deviation of the angles is beyond a threshold value.

According to a further aspect of the invention, a system for calibrating an angular measurement sensor comprises an angular measurement sensor to be calibrated and a device for calibrating this angular measurement sensor according to the method described above. Accordingly, the device for calibrating comprises an acceleration measurement device, a unit for determining a level plane using the acceleration measurement device therefor, a unit for receiving an angle obtained by two level plane determinations, a unit for receiving an angle provided by the angular measurement sensor. The angular measurement sensor and the calibration device have to be arranged to each other in an arbitrary way ensuring that the relative position and angle between angular measurement sensor and acceleration measurement device are fastened during the rotation procedure.

Preferably, the unit for receiving an angle provided by the angular measurement sensor of the device for calibrating the angular measurement sensor may comprise a unit for determining measured values given by the angular measurement sensor and a unit for receiving an angle according to the measured values determined by the angular measurement sensor.

Conveniently, the device for calibrating further comprises a unit for determining a new scale factor of the angular measurement sensor.

Additionally, means for re-calibrating like an electronic connection between calibration device and angular measurement sensor may allow the transmission of the obtained calibration data directly to the angular measurement sensor so that no connection calibration data have to be transmitted in an manually way. Due to the type of the angular measurement sensor and the possibly connected signal processing unit different ways of setting a new scale factor are possible.

The device for calibrating an angular measurement sensor may be able to calibrate a plurality of angular measurement sensors at the same time which may be performed for calibrating devices comprising several angular measurement sensors like devices for initial navigation. The angles obtained by the level plane determinations using the acceleration measurement device may be compared with angles obtained by each angular measurement sensor of the plurality of angular measurement sensors. It is obvious that the method for calibrating an angular measurement sensor may be extended accordingly to a method for calibrating a plurality of angular measurement sensors.

Preferably, the embodiment of the device for calibrating comprises additionally a unit for determining the maximal and/or minimal acceleration value during the displacement procedure. More preferably, the acceleration signals generated by the acceleration measurement device may be determined during rotation to obtain maximal and minimal acceleration values of the acceleration sensors used for measuring acceleration perpendicular to the rotating axis to gain the local acceleration value of the gravity. A rotation procedure with respect to an axis by an angle of 360° may ensure that the obtained acceleration values may be valid for determining the strength of the local gravity.

Additionally, a system for calibrating an angular measurement sensor comprises an angular measurement sensor to be calibrated and a device for calibrating this angular measurement sensor according to the method described above wherein the device for calibrating comprises additionally a unit for transmitting and receiving data via a communication network. This embodiment includes the advantage that not all necessary units essential for carrying out the method for calibrating are to be implemented in the calibration device. These advantages are widely described above and can be adopted to this system. Determination and evaluation steps of the method require complex calculations so that it can be advantageous to carry out several steps at a remote side. Due to the certain embodiment of the device different units may be replaced by using remote units or devices which are able to perform the operation of the units which they replace.

Conveniently, the angular measurement sensor may be a angular rate measurement sensor and the measured values obtained by the angular rate measurement sensor may be measured speed values. The angle of the displacement procedure according to the angular rate measurement sensor may be obtained by integrating the speed values. A setting of the angular rate measurement sensor to an initial speed value may be necessary in order to perform the integration of the obtained speed values. Moreover, the speed values may be measured with respect to an axis defined by the angular rate measurement sensor. Further, the speed values may be rotation speed values. Additionally, the speed values may be angular speed values. The speed values may not be limited to a rotation speed or an angular speed since the displacement may be carried out in an arbitrary way. Conveniently, the angular measurement sensor may be an angular rate integrating measurement sensor and the measured values obtained by the angular rate integrating measurement sensor may be measured angle values. The angle of the displacement according to the angular rate integrating measurement sensor may be obtained by subtracting the angle values. A setting of the angular rate integrating measurement sensor to an initial angle value may be necessary in order to perform the subtraction of the obtained angle values. Moreover, the angle values may be measured with respect to an axis defined by the angular rate integrating measurement sensor.

Conveniently, the displacement of the assembly comprising the angular measurement sensor and the acceleration measurement device may be a displacement by a certain angle with respect to an axis. The axis may be defined by the angular measurement sensor. Preferably, the angle may be a rotation angle or a rotation angle with respect to the axis defined by the angular measurement sensor, respectively. Further, the angular measurement device may be rotated by about 360° around the corresponding axis. Further, the axis around which the acceleration measurement device and the angular measurement sensor may be rotated is substantially perpendicular to the direction of the gravity vector.

Additionally, the calibration may be repeated as long as said deviation of the angles is beyond a threshold value.

This kind of implementation of the units for calibrating can be used advantageously by implementing only units which are used often and not only for determining and evaluation due to the calibration method. All units which are only used for calibration can be replaced by the employment of remote evaluation and calculation service.

Conveniently, the transmission and receiving unit can be realised using all existing communication networks able to transmit data. A wide area network is of special interest to provide this implementation to a great variety of devices. The wide area network can be a wide area radio communication network, a wide area mobile communication network, like global system for mobile communication (GSM), universal mobile telecommunication system (UTMS), wide-band code division multiple access (WCDMA) or likely or related mobile communication standards. But also local area transmission network can be of interest to perform evaluation and calculation steps on a personal or mobile computer or any device able to perform the evaluation and calculation steps according to the calibration method. A local area communication network can be a low power radio frequency network, an infrared transmission network, a network based on wireless local area network (WLAN) or even a wire-based connection like universal serial bus (USB), Firewire bus or serial connection or any other kind of wire-based connection.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

BEST MODE FOR CARRYING OUT THE INVENTION

Figure 1:
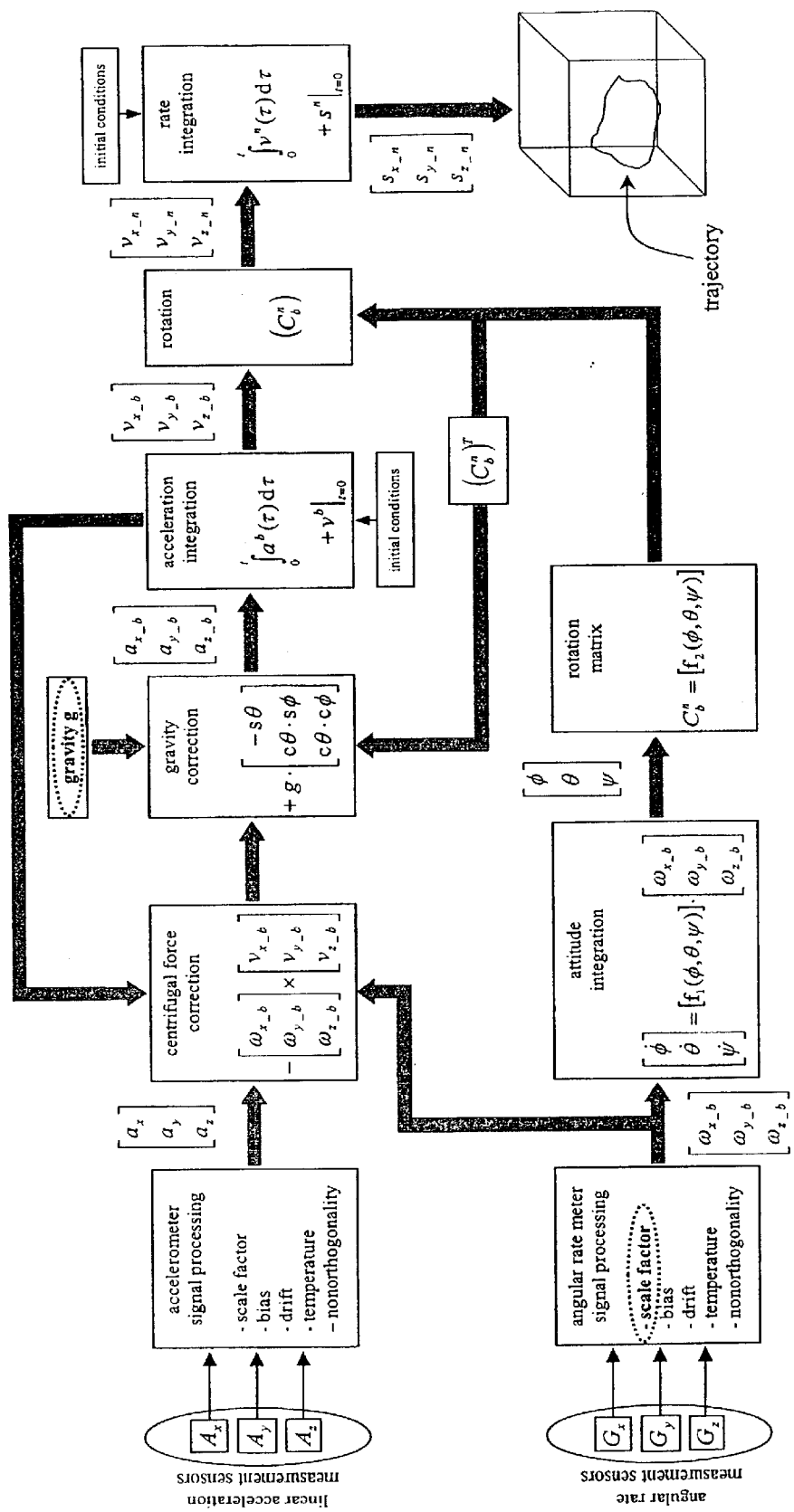
FIG. 1 is a schematic diagram to illustrate the process steps of an inertial navigation system where the calibration method of the present invention can be applied.

FIG. 1 illustrates a block diagram of a state of the art inertial navigation system without the demand of completeness. This embodiment of an inertial navigation system shall illustrate at which points the calibration method of the present invention affects this kind of systems. The calibration method of the present invention affects the scale factor of the angular rate measurement device and the gravity vector g both marked in the Fig. by an ellipsoid shape. The procedure of gaining and evaluating measurements of inertial navigation systems in well known to people skilled in the art (for example: Farrell, J. and Barth, M., "The Global Positioning System and Inertial Navigation", The McGraw-Hill Companies Inc. 1988).

Beginning with the signals of the accelerometers the measured acceleration is corrected due to centrifugal acceleration and gravity acceleration. As a result of the corrections the linear acceleration in the system body marked with suffix b is obtained. The acceleration in the body system is integrated by time resulting to the velocity in the body system. To obtain navigation coordinates related to an external coordinate system for example related to an earth fixed system a body-to-inertial transformation is performed to gain the velocity marked with suffix n. In a last integration step the velocity is integrated to gain the trajectory in said earth fixed navigation system.

The angular rate signals are essential in this process at different points. The correction of the centrifugal acceleration requires the knowledge of the angular rate. The integration of the angular rate leads to the different rotation angles of the body. These rotation angles are required for gravity acceleration correction and for the body-to-inertial transformation since the linear acceleration measurement can not distinguish between acceleration due to changes in the velocity and gravity.

It could be seen easily that deviations in the scale factor and gravity acceleration and/or vector direction of the gravity acceleration are disadvantageous for the accuracy of the complete process. Therefore, a simple and fast practicable method to calibrate this quantities is advantageous.

Figure 2:
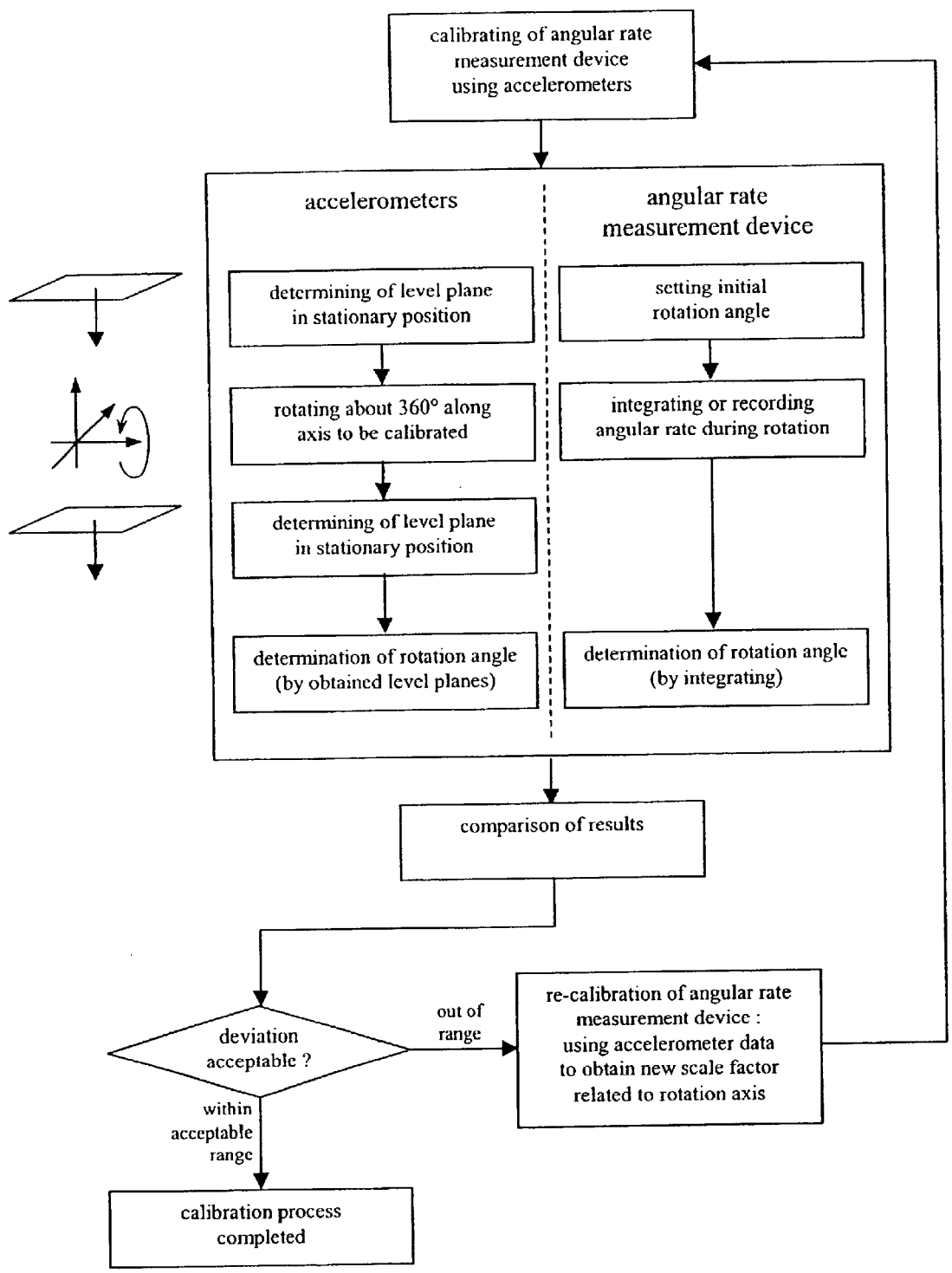
FIG. 2 is a block diagram showing the steps of the method for calibrating an angular rate measurement device using acceleration measurement device.

FIG. 2 shows a block diagram to illustrate the necessary steps of the calibration process related to the present invention performed by using an sensor assembly comprising an acceleration measurement device and an angular rate measurement device wherein the acceleration measurement device comprises three acceleration measurement sensors arranged perpendicularly to each other and the angular rate measurement device comprises at least one angular rate measurement sensor. Generally angular rate measurement devices also comprise three angular rate measurement sensors arranged perpendicularly to each other to track all attitude angles.

The calibration process is started by determining the level plane relating to the sensor assembly in stationary position using the acceleration measurement device. Further the sensor assembly is rotated about 360° along the axis to be calibrated. Preferably direction of the axis is chosen to be substantially parallel to the level plane, i.e. perpendicular to the direction of the gravity vector. After rotating, the level plane relating to the sensor assembly is determined again. The total rotation angle can be obtained by comparing the position of the assembly relating to the two level plane determinations. If the rotation axis is chosen to be substantially parallel to the level plane, the rotation angle according to the rotation can be obtained as best as possible as is obvious to those skilled in the art. Simultaneously to the measurement process related to the acceleration measurement device, the rotation angle of the angular rate measurement device is set to an initial value, i.e. is set to zero. During rotating the assembly the angular rate is measured.

The total rotation angle of the assembly is obtained by integrating these angular rate values. The integration process can be performed during the rotation procedure or the angular rate values are stored during rotating and integrated thereafter. The calibration process provides both a total rotation angle due to the acceleration measurement device and a total rotation angle due to the angular rate measurement device. The comparison of these two angles allows estimation of the accuracy of the angular rate measurement device and can be used to determine a new scale factor of the angular rate measurement device to enhance accuracy.

Figure 3:
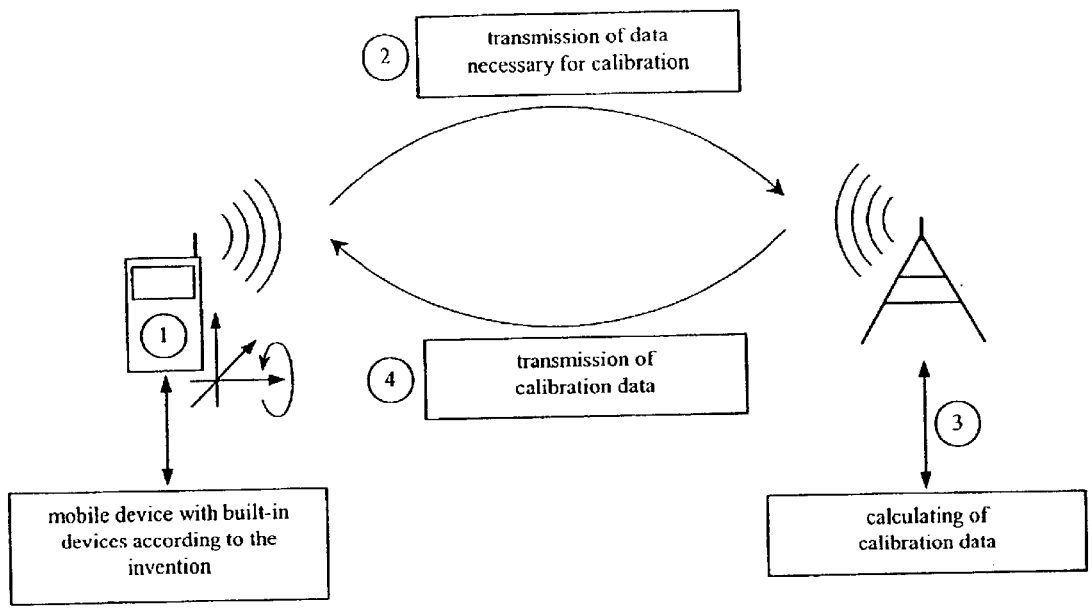
FIG. 3 is a schematic showing another preferred embodiment using transceiving capability of a mobile device to perform calculations related to the calibration method of the present invention outside this mobile device.

FIG. 3 shows a preferred embodiment of device 1 with built-in inertial sensor assembly. It is fair to assume that all units necessary to perform the calibration of an angular measurement device are included in that device comprising the device to be calibrated. Due to the fact that additional units are cost-intensive and often enlarge the housing and increase the weight of the device, particularly of interest with regard to mobile devices, a part of the units can be left out and the missing features can be compensated by using a transmission network.

The device 1, shown in FIG. 2, comprises only the acceleration measurement device and angular rate measurement device and a unit for transmitting the data obtained during the calibration process. If necessary, a unit for buffering the data can be included so that the transmission of the data can be performed after the rotating process. As seen in FIG. 3, these data are transmitted 2 to an independent instance 3. All necessary calculations, like integration of the angular rate data, determination of the level planes related to the acceleration measurement data, comparing of the rotation angles relating to the two independent determinations provided by acceleration data or angular rate data, respectively and if necessary calculation of a new scale factor for the angular rate measurement device are performed by this independent instance 3 outside the device 1.

Various instances are thinkable. For example, if the inertial sensor assembly is built in a mobile phone, transmission is performed via a wide area telecommunication network like GSM, UMTS or other related standards applied for mobile communication. In this case a service provider attached to the mobile communication network performs the calculation steps and transmits 4 the result back to the mobile phone, i.e. transmitting a new scale factor or informing that the calibration process is completed successfully. This service provider can be attached itself to the mobile communication network using for example the internet.

But also a local area transmission network can be used, for example, if the calculation and evaluation steps are performed using a personal or mobile computer or the like able to run a program providing the capability to compensate the steps of the calibration process not implemented in the device 1. Transmission to such additional devices can be applied using communication standards like Bluetooth, infrared (IR) transmission or WLAN. Even communication standards based on wire connections can be applied.

According to the demand of the calibration process and number and kind of implemented units, it is obvious that the function of non implemented units is transferred to an instance outside the device which includes the sensor assembly. The number of implemented units according to the calibration method can be different in different embodiments.

Figure 4:
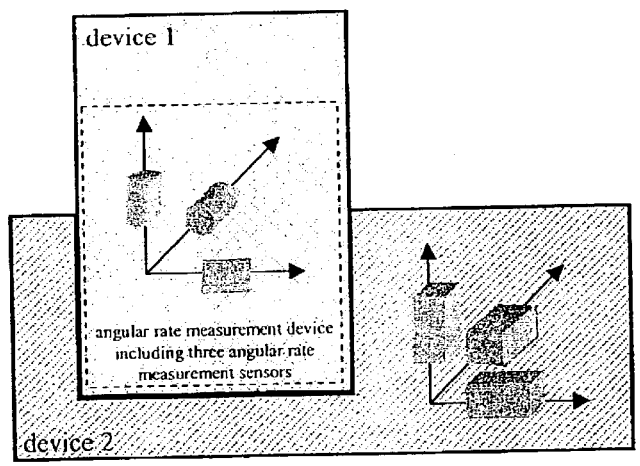
FIG. 4 is a schematic showing another preferred embodiment using a fixed-on device to check the calibration of an angular rate measurement device.

FIG. 4 shows a schematic view of an another preferred embodiment. To check the calibration of a device 1 which includes an angular rate measurement device built of at least one angular rate measurement sensor (three sensors arranged perpendicularly to each other are shown in FIG. 4), a second device 2 including an acceleration measurement device (three sensors arranged perpendicularly to each other are shown in FIG. 4) like that discussed above is fixed in any way to the device 1. Performing the method of the present invention allows comparison of the calculated rotation angles in order to check the calibration of the angular rate measurement device built-in device 1. In case of deviations, an optional electronic connections could allow the user of device 1 to recalibrate the angular rate measurement device of device 1 automatically. Otherwise if no connection is available the user could lay to claim service of device 1 knowing that re-calibration is necessary. This knowledge is of particular interest due to the fact that re-calibration service is generally cost-intensive.

Having described the invention, what is claimed is:

1. A method for calibrating an angular measurement sensor using an acceleration measurement device, comprising the steps of:
    determining a level plane using said acceleration measurement device in a first stationary position,
    displacing said angular measurement sensor,
    determining values measured by said angular measurement sensor during displacing,
    again determining said level plane in a second stationary position similar to said first stationary position,
    receiving an angle according to said level planes determined by said acceleration measurement device,
    receiving an angle according to said values determined by said angular measurement sensor and
    comparing said angles,
wherein said acceleration measurement device is attached in a fixed way to the angular measurement sensor and said level plane is adjusted such that it is perpendicular to the direction of the gravity vector.

2. A method according to claim 1, further comprising:
    obtaining a new scale factor given by said angles for said angular measurement sensor if the deviation between said angles is beyond a threshold value.

3. A method according to claim 2, further comprising:
    re-calibrating said angular measurement sensor using said new scale factor.

4. A method according to claim 1, wherein said angular measurement sensor is an angular rate measurement sensor and wherein said values are speed values.

5. A method according to claim 4, wherein said speed values are rotation speed values.

6. A method according to claim 4, wherein said speed values are angular speed values.

7. A method according to claim 1, wherein said angular measurement sensor is an angular rate integrating measurement sensor and wherein said values are angle values.

8. A method according to claim 1, wherein said displacing is a displacing by a certain angle with respect to an axis.

9. A method according to claim 8, wherein said certain angle is a rotation angle.

10. A method according to claim 9, wherein said angular measurement device is rotated by about 360° around said axis.

11. A method according to claim 9, wherein said axis around which said acceleration measurement device and said angular measurement sensor are rotated is substantially perpendicular to the direction of the gravity vector.

12. A method according to claim 1, wherein the calibration method is repeated as long as said deviation of said angles is beyond a threshold value.

13. A method according to claim 1, wherein acceleration signals generated by said acceleration measurement device are determined during displacement to obtain maximal and minimal acceleration values of said acceleration sensors used for measuring a local acceleration value of the gravity.

14. A computer program product for carrying out a method for calibrating an angular measurement sensor using an acceleration measurement device, comprising downloadable program code that when downloaded is stored on a computer readable medium, said program code for carrying out the steps of any one of said methods for calibrating when said product is run on a computer or a network device, wherein said method for calibrating comprises the following steps:
    determining a level plane given by an acceleration measurement device in a first stationary position,
    determining values measured by said angular measurement sensor during displacing,
    again determining said level plane in a second stationary position similar to said first stationary position,
    receiving an angle according to said level planes determined by said acceleration measurement device,
    receiving an angle according to said values determined by said angular measurement sensor and
    comparing said angles.

15. A computer program product according to claim 14, further comprising:
    obtaining a new scale factor by said angles for said angular measurement sensor if the deviation between said angles is beyond a threshold value.

16. A computer program product according to claim 15, further comprising:
    re-calibrating said angular measurement sensor using said new scale factor.

17. A computer program product comprising program code means stored on a computer readable medium for carrying out a method for calibrating an angular measurement sensor using an acceleration measurement device when said program product is run on a computer or network device, wherein said method for calibrating comprises following steps:
    determining a level plane given by an acceleration measurement device in a first stationary position,
    determining values measured by said angular measurement sensor during displacing,
    again determining said level plane in a second stationary position similar to said first stationary position,
    receiving an angle according to said level planes determined by said acceleration measurement device,
    receiving an angle according to said values determined by said angular measurement sensor and
    comparing said angles.

18. A computer program product according to claim 17, further comprising:
    obtaining a new scale factor by said angles for said angular measurement sensor if the deviation between said angles is beyond a threshold value.

19. A computer program product according to claim 18, further comprising:
    re-calibrating said angular measurement sensor using said new scale factor.

20. A device for calibrating an angular rate measurement sensor, wherein the device comprises:
    an acceleration measurement device for calibrating said angular measurement sensor, a unit for determining a level plane obtained by said acceleration measurement device, a unit for determining values measured by said angular measurement sensor, a unit for receiving an angle obtained by level planes, a unit for receiving an angle according to said values measured by said angular measurement sensor and a unit for comparing said angles, wherein said acceleration measurement device comprises acceleration measurement sensors arranged in such a way that the direction of gravity can be distinguished related to the three space directions.

21. A device according to claim 20, wherein the device further comprises a unit for determining a scale factor of said angular measurement sensor.

22. A device according to claim 20, wherein the device further comprises means for re-calibrating said angular measurement using said new scale factor.

23. A device according to claim 20, wherein the device additionally comprises a unit for determining the maximal and/or minimal acceleration value during the displacement procedure to obtain a local value of gravity.

24. A device according to claim 20, the device using a transmission network for data exchange, wherein said device comprises a unit for transmitting and receiving measurement and/or evaluation and/or calculation and/or calibration data via a communication network and wherein a part of the units or all of the units are connected to the calibration device via said unit for transmitting and receiving.

25. A device according to claim 24, wherein said communication network is a wide area communication network.

26. A device according to claim 24, wherein said communication network is a wide area radio communication network.

27. A device according to claim 24, wherein said communication network is a network for mobile communication.

28. A device according to claim 24, wherein said communication network is local area communication network.

29. A device according to claim 24, wherein said communication network is low power radio frequency network.

30. A device according to claim 24, wherein said communication network is local infrared transmission network.

31. A device according to claim 24, wherein said communication network is a wire based communication network.

32. A system for calibrating angular rate measurement sensor, comprising:

an angular measurement sensor and a device for calibrating an angular measurement sensor, comprising:

an acceleration measurement device for calibrating said angular measurement sensor, a unit for determining a level plane obtained by said acceleration measurement device, a unit for receiving an angle obtained by level planes, a unit for receiving an angle provided by said angular measurement sensor and a unit for comparing said angles, wherein said angular measurement sensor is fixed to said device for calibrating angular measurement sensor and wherein said acceleration measurement device comprises acceleration measurement sensors arranged in such a way that the direction of gravity can be distinguished related to the three space directions.

33. A system according to claim 32, wherein the unit for receiving an angle provided by said angular measurement sensor of the device for calibrating further comprises:

a unit for determining values measured by said angular measurement sensor and a unit for receiving an angle according to said values determined by said angular measurement sensor.

34. A system according to claim 32, wherein the device for calibrating an angular rate measurement sensor further comprises:

a unit for determining a scale factor of said angular measurement sensor.

35. A system according to claim 32, wherein the device for calibrating an angular rate measurement sensor further comprises:

means for re-calibrating said angular measurement using said new scale factor.

36. A system according to claim 32, wherein the device for calibrating an angular measurement sensor additionally comprises a unit for determining the maximal and/or minimal acceleration value during the displacement procedure to obtain a local value of gravity.

37. A system according to claim 32, using a transmission network for data exchange, wherein said device for calibrating an angular measurement sensor comprises a unit for transmitting and receiving measurement and/or evaluation and/or calculation and/or calibration data via a communication network and wherein a part of the units or all units are connected to the device for calibrating angular measurement sensor via said unit for transmitting and receiving.

* * * * *

UNITED STATES PATENT AND TRADEMARK OFFICE
CERTIFICATE OF CORRECTION

PATENT NO. : 6,834,528 B2
APPLICATION NO. : 10/292409
DATED : December 28, 2004
INVENTOR(S) : Kappi et al.

It is certified that error appears in the above-identified patent and that said Letters Patent is hereby corrected as shown below:

In claim 14 at column 16, line 7, please insert the word --program-- before the word "product".

Signed and Sealed this

Fifth Day of June, 2007

JON W. DUDAS
*Director of the United States Patent and Trademark Office*